Patented July 21, 1925.

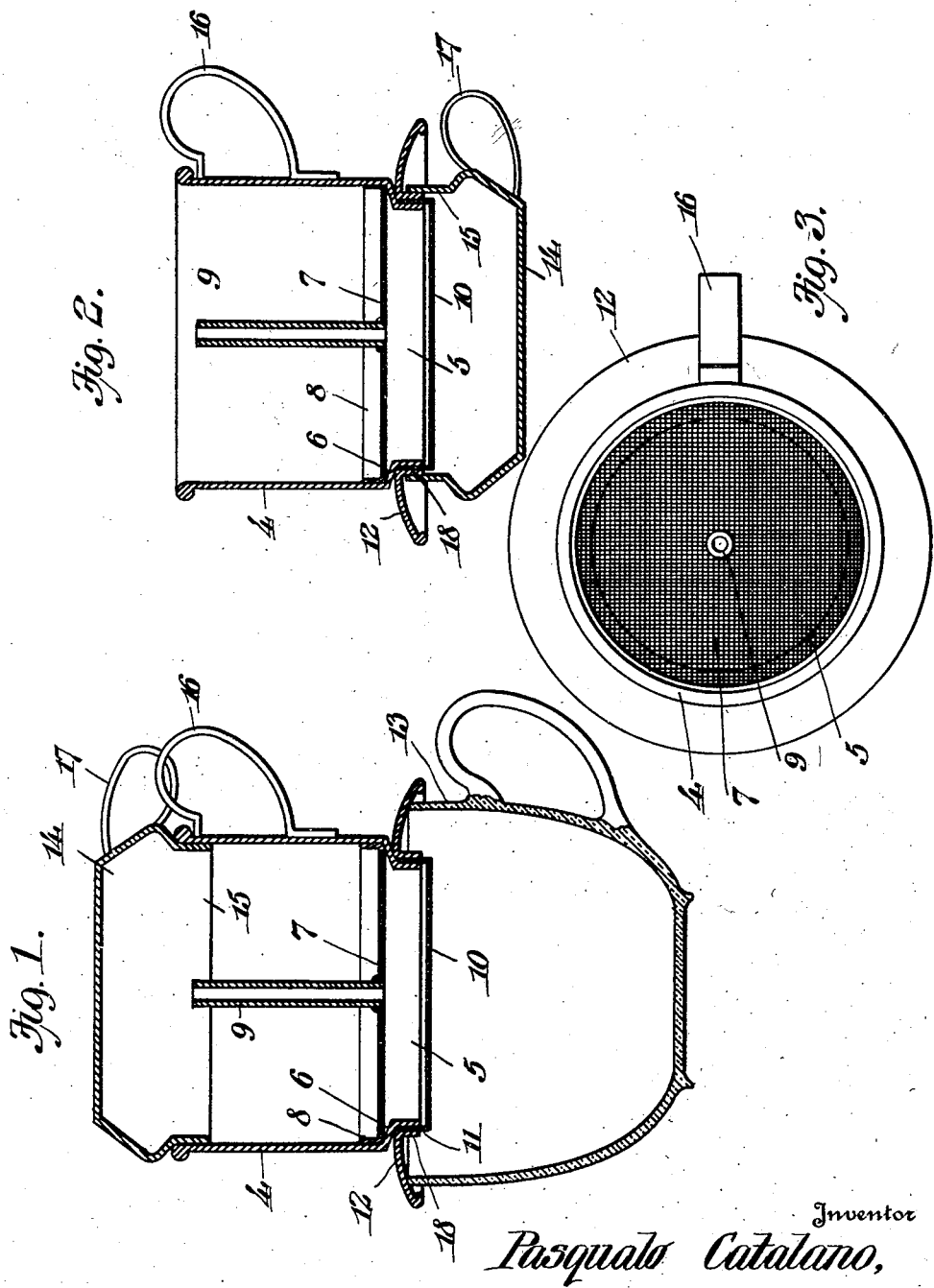

1,546,434

UNITED STATES PATENT OFFICE.

PASQUALO CATALANO, OF NEW YORK, N. Y.

INDIVIDUAL INSTANT-COFFEE PRODUCER.

Application filed December 9, 1924. Serial No. 754,722.

*To all whom it may concern:*

Be it known that I, PASQUALO CATALANO, a subject of the King of Italy, residing at New York city, New York, have invented certain new and useful Improvements in Individual Instant-Coffee Producers, of which the following is a specification.

This invention relates to beverage making devices, and particularly to coffee producers.

The primary object of the invention is to provide means whereby an individual cup of coffee may be quickly and easily made without resorting to the necessity of cooking, and yet which will produce coffee of the proper strength and flavor.

A further object of the invention is to provide a device of this character which is of such construction as to be easily and quickly taken apart for washing and yet which can not become so dismembered as to be inoperative, which is of simple construction and therefore capable of being produced at low cost, and which will prove highly practical and efficient in operation.

With these objects in view, together with others which will appear as the description proceeds, the invention consists in the novel construction, combination and arrangement of parts, all as will be described more fully hereinafter, illustrated in the drawing, and particularly pointed out in the claim.

In the drawing:

Fig. 1 is a vertical sectional view taken through an ordinary tea or coffee cup and showing, also in section, the application of a coffee producer constructed in accordance with the invention, Fig. 2 is a similar view of the producer and showing the use of the top thereof as a drip collector, and Fig. 3 is a plan view of the device as shown in Fig. 2.

The coffee producer includes a body 4 of cylindrical form and made of suitable material. This cylinder is of comparatively small length, and substantially smaller in diameter than the open end of the usual coffee cup. The lower end of this cylinder is contracted so as to produce a neck 5 of slightly smaller diameter than the body 4, and the shoulder 6 at the juncture of the neck with the body constitutes an indication to be hereafter more specifically described, and also a stop to limit the downward travel of a foraminous disc, plate or cover indicated at 7. This plate is provided at its outer edge with an upstanding flange 8 to closely fit the inner wall of the body 4, and is provided with a central upstanding tube 9 of a proper length. The lower end of this tube communicates with the under side of the disc.

The lower end of the body 4, is covered by a foraminous bottom 10, which may be made of perforated metal as shown in Figs. 1 and 2, or may be constructed of fine mesh wire as will be understood. This also applies to the disc 7, and in Fig. 3 of the drawing the said disc is represented as being constructed of fine mesh gauze wire. The outer edges of the bottom 10 are upturned to provide a flange 11 which tightly engages the exterior of the neck 5, and is held tight in place upon the said neck by a ledge member 12 secured to the exterior of the neck. The ledge 12 is of circular form and projects a substantial distance beyond the body, having a central opening as shown to receive the neck 5. This ledge is adapted to rest upon the upper edge of the coffee cup indicated at 13, so as to properly support the body above the same.

The upper end of the body 4 is closed by a cover 14, which has a mouth 15 of a size to snugly fit within the upper end of the body. This cover also serves as a drip collector, and the neck 5 is of such diameter as to snugly fit within the open end 15 of the cover when the latter is to be used as a drip collector, as indicated in Fig. 2 of the drawing. Both the body 4 and cap 14 are provided with handles 16 and 17 for convenient manipulation of these parts.

In operation, the body 4 will be positioned upon the cup 13 in the manner shown in Fig. 1, except that the cover 14 and disc 7 are removed. When it is desired to make a cup of coffee the ground coffee will be poured into the body until it reaches a level substantially even with the ledge 6. This quantity has been found in practice to be ample for producing a single cup of coffee of proper strength. The disc 7 is then placed within the body and moved downwardly until limited either by the stop 6 or by coming in contact with the upper surface of the ground coffee. With the device thus assembled, scalding water is poured into the upper end of the body, whereupon the cover 14 is placed in position over the top as shown. The scalding water passes through the foraminous disc 7 and percolates through the ground coffee contained between the bottom 10 and disc 7, carrying with it the flavor and strength and passing into the cup 13. After this drip operation has been completed, the body is removed from the cup and the cover 14 is placed beneath the same as shown in Fig. 2 to collect the drip which may remain in the body of the coffee.

Should it be desired to produce more than a single cup of coffee, or should it be found desirable to increase the strength of the same, more of the ground coffee may be introduced to the body 4 between the foraminous members 10—7. It will also be understood that the strength or quality of the beverage produced may depend upon the size of the openings in the member 10—7, and therefore the sizes of these openings or meshes may be increased or diminished.

It will also be understood that should it be desired to percolate the coffee, the body with its ground coffee may be placed over a cooking vessel filled with water and placed over a fire, whereupon the boiling water and vapors will permeate the ground coffee and draw the strength and flavor therefrom.

It is preferred that the bottom 10 have its upstanding flange 11 secured between a depending flange 18 defining the central opening of ledge member 12, and the neck 5. This may be done by any of the well known metal working operatings, or may be carried out by soldering.

From the foregoing it is apparent that have provided a coffee producer of extremely simple construction and which may be marketed at low cost, and yet which is fully capable of producing coffee beverage in proper strength and proportion without cooking and without the exercise of special culinary skill.

Having thus described my invention, I claim:

In a device of the class described, a tubular body, a neck at one end of said body, a ledge member for said neck, a foraminous bottom for said neck, a flange on said bottom held between said neck and said ledge member, a foraminous disc removably arranged within said tubular body, a tube extending up centrally from said disc, and a cover for said body.

In testimony whereof I affix my signature.

PASQUALO CATALANO.